United States Patent [19]
Jepsen et al.

[11] 3,830,133
[45] Aug. 20, 1974

[54] TIGHTENING NUT

[75] Inventors: Kurt Friedrich Jepsen, Siegen; Wolfgang Janzen, Wilnsdorf-Obersdorf, both of Germany

[73] Assignee: Amsted-Siemag Kette G.m.b.H., Betzdorf/Sieg, Germany

[22] Filed: Apr. 20, 1973

[21] Appl. No.: 353,203

[30] Foreign Application Priority Data
Apr. 25, 1972 Germany............................ 2220166

[52] U.S. Cl. ................................................ 85/32 R
[51] Int. Cl. ............................................ F16b 33/00
[58] Field of Search ................... 85/32 R, 32 T, 62; 151/41.5, 33, 40

[56] References Cited
UNITED STATES PATENTS
| 1,077,425 | 11/1913 | Old ........................................ 151/40 |
| 3,462,180 | 8/1969 | Bunyan .................................. 85/32 R |
| 3,463,044 | 8/1969 | Rossman et al. ....................... 85/32 R |
| 3,490,796 | 1/1970 | Smith ..................................... 85/62 |
| 3,618,994 | 11/1971 | Gepfert ................................. 85/32 R |

FOREIGN PATENTS OR APPLICATIONS
| 672,538 | 10/1963 | Canada ................................. 85/32 R |
| 991,783 | 5/1965 | Great Britain ......................... 85/62 |
| 1,116,947 | 11/1961 | Germany ............................. 85/32 R |
| 1,262,330 | 1/1963 | France ................................. 85/32 R |

Primary Examiner—Marion Parsons, Jr.
Attorney, Agent, or Firm—Toren, McGeady and Stanger

[57] ABSTRACT

The invention relates to a tightening nut for a bolt which projects in relation to a mounting surface. The nut comprises at least two nut rings which are displaceable one inside the other in the axial direction. One nut ring bears against the mounting surface and the other nut ring surrounds and engages the bolt and bears through at least one thrust stud against the first nut ring. The thrust studs are tilted during the tightening from an inclined position in relation to the nut axis into a position parallel to the nut axis. Either the second nut ring or a drive ring mounted between the thrust studs and one of the nut rings is rotatable to produce the tilting of the thrust studs and a drive pin having an axis of rotation parallel to the nut axis is mounted for rotation in a non-rotatable one of the nut rings and is in geared connection with the second nut ring or the drive ring respectively.

7 Claims, 2 Drawing Figures

TIGHTENING NUT

The invention relates to a tightening nut for an article to be tightened, for example a bolt, which projects in relation to a mounting surface, the tightening nut comprising at least two nut rings which are displaceable one inside the other in the axial direction and of which one bears against the mounting surface and the second surrounds and engages the bolt or other article and bears, through at least one thrust stud, against the one nut ring. The thrust studs are tilted, during the tightening, out of an inclined position in relation to the nut axis into a position parallel to the nut axis.

Tightening nuts and bolts are generally provided with a thread and during the tightening, the tightening nuts are screwed against the mounting surface with a wrench until the required tension becomes established in the bolt. This tension results from the momentum with which the wrench is moved and from the pitch of the thread. It is true that a thread, which has a very fine pitch, can be used and the wrench can also be lengthened. In practice, however, considerable limits are imposed on the tension which can be reached by choice of the thread pitch and the length of the wrench. In addition, with frequent actuation, such tightening nuts are subject to heavy wear as a result of the friction which occurs and the inadequate possibilities for lubrication.

With the tightening nuts of the kind referred to in the first paragraph, on the other hand, a very much higher tension can be achieved in the bolts than with comparable screw-nuts. This results from the geometry of the thrust stud movement during their tilting upon tightening because the closer the thrust studs come to their parallel position, the less the resulting variation in the distance between the nut rings, with a steady thrust stud movement. That is to say, the tightening movement in the tightening nuts is reinforced by the thrust studs, regardless of any screwing to the bolts, with a very much greater transmission ratio than the transmission ratio resulting from a fine thread for example. Furthermore, in the tightening nuts of the kind referred to at the beginning, effective lubrication of the thrust studs is possible, which reduces the friction and with the friction, the wear which occurs. Despite the exceptional transmission ratio in the tightening nuts of the kind referred to at the beginning, considerable forces are still often necessary for the required tension.

It is therefore the object of the invention to increase still further the transmission ratio in the tightening nuts.

According to the invention, in a tightening nut of the kind described in the first paragraph, either the second nut ring or a drive ring mounted between the thrust studs and one of the nut rings is rotatable to produce the tilting of the thrust studs and a drive pin having an axis of rotation parallel to the nut axis is mounted for rotation in a non-rotatable one of the nut rings and is in geared connection with the second nut ring or the drive ring respectively. If the geared connection with the drive ring or the rotatable nut ring incorporates a toothed-wheel gear, an appreciable additional transmission ratio necessarily results from the given constructional relationships. This transmission ratio is further considerably increased and the structural expense necessary for the geared connection is reduced if the drive pin is provided eccentrically with a dog which engages in a recess in the second nut ring or the drive ring. The width of recess opening is such that the dog causes a swivelling movement of the drive ring or second nut ring relatively to the non-rotatable nut ring, at least on each revolution of the drive pin.

With a drive ring or nut ring which executes a movement sufficient to tilt the thrust studs into the parallel position after each swivelling movement of the drive pin through 90°, the additional transmission ratio increases in the same manner as the transmission ratio associated with the thrust studs during their tilting. The eccentricity of the stud may be equal to the travel necessary for tilting the thrust studs into the parallel position.

The recess for the dog and/or the dogs may be arched cylindrically so that a minimum friction occurs between the dog and the drive ring or second nut ring, apart from the lubrication. Lubrication is facilitated by the fact that the recess in the second drive ring or nut ring can be used as a lubricating chamber after suitable sealing. A construction of the one nut ring bearing against the mounting surface in the form of a ball-and-socket joint contributes to a satisfactory operation of the tightening nut. As a result of the ball-and-socket joint, which can also be used independently of the special arrangement of the thrust bolts, the tightening nut adjusts itself, within wide limits, to every inclination of the bolt or other article to be tightened in relation to its mounting surface so that forces extending transversely to the nut axis are avoided, which might prevent swivelling of the thrust bolts and cause unforeseen wear.

One example of a nut constructed in accordance with the invention is illustrated in the accompanying drawings, in which.

Figure 1:
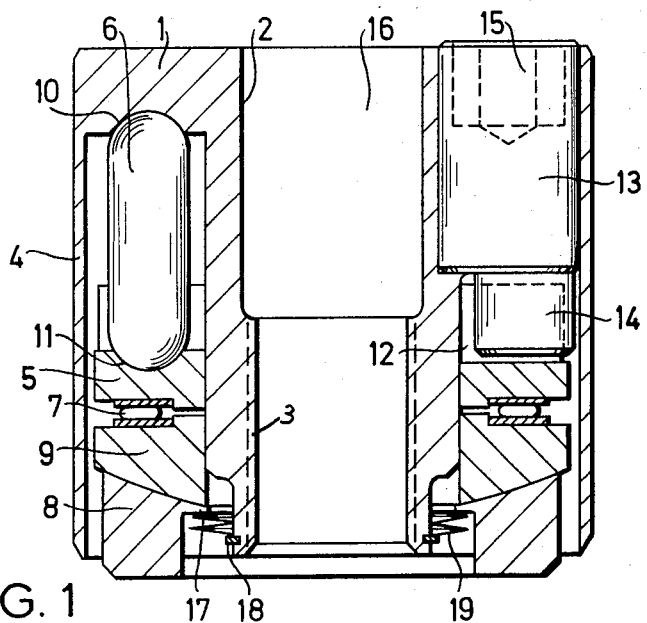
FIG. 1 is an axial section.
Figure 2:
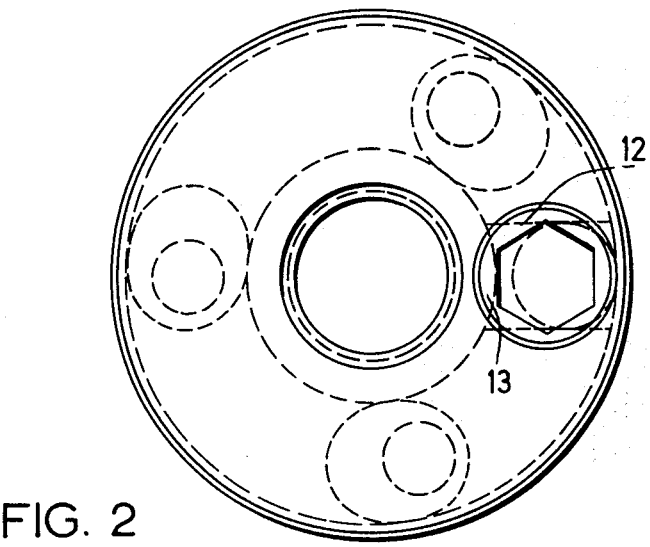
FIG. 2 is a diagrammatic plan view.

An annular cap 1 forming one nut ring, receives a drive ring 5, with which it is relatively axially displaceable, between an inner wall 2 formed with an internal thread 3 for a bolt not illustrated, and an outer wall 4. In the cap 1, the drive ring 5 bears on the one hand through three thrust studs 6 against the closed end of the cap 1 and on the other hand through a roller bearing 7 against the other nut ring that is constructed in the form of a ball-and-socket joint which projects from the open end of the cap 1 and which consists of an annular part-spherical socket 8 and an annular part ball head 9.

Each thrust stud 6 is cylindrical and rounded at its two ends with which it engages in correspondingly round recesses 10 and 11 of which the one designated by 11 is in the drive ring 5 and the one designated by 10 is in the closed end of the cap 1. Both recesses are the same distance from the nut axis 16. Besides the recess 11, the drive ring 5 also has a groove 12 which extends in the radial direction. A drive pin 13, mounted for rotation in the closed end of the cap 1, has an eccentric dog 14 which engages the groove 12. The stud has a cylindrical cross-section and the groove 12 has a width equal to the diameter of the stud, apart from a clearance necessary for the movement of the dog 14. For turning the drive pin 13, it is provided with a recess 15, which is accessible from the closed end of the cap, for a wrench. On rotation of the drive pin 13 with the wrench, the dog 14 is displaced over a circular path as a result of its eccentric arrangement, and turns the drive ring 5 which in turn tilts the thrust bolts 6 as a result of their support in the recesses 10 and 11.

In FIG. 1, the thrust stud 6 is illustrated in its tightened position in which its longitudinal axis extends parallel to the nut axis 16. In the initial position, on the other hand, that is to say the untightened position of the nut, the longitudinal axis of the thrust bolt extends obliquely to the nut axis 16.

Apart from this, the ball socket 8 surrounds the inner wall of the cap 1 with a flange 17 and a retainer ring 18 is let into the wall end of the cap 1 projecting through the flange 17. Between the flange 17 and the Seeger ring 18 is a spring 19, which is constructed in the form of a coil spring or consists of a plurality of cup springs and ensures, preferably with little tensioning, that the thrust studs 6, the drive ring 5, the rolling bearing 7, the ball head 9 and the ball socket 8 assume their initial position in the cap 1.

During the mounting of the tightening nut, the cap 1 is screwed with its internal thread 3 onto the bolt projecting from a wall and is screwed against the wall until the pressure socket 8 bears firmly against the wall. This is preferably effected by hand because the thread 3 has an easy action and the ball socket 8 comes to bear against the wall with a slight closing action as a result of its ability to tilt on all sides. Then the wrench is inserted in the recess 15 in the drive pin 13 and the thrust studs 6 are tilted out of an initial inclined position into the position parallel to the nut axis 16, through the drive ring 5, by turning the drive pin 13. In the course of this, the distance between the inner face of the cap 1, at the thrust stud side, and the drive ring 5 is necessarily altered and the cap 1 is moved away from the wall by the thrust studs 6 while the thrust studs 6 bear against the wall through the drive ring 5, the rolling bearing 7, the ball head 9 and the ball socket 8. The forcing away of the cap 1 then causes a tightening of the tension on the bolt which is screwed into the cap 1 and projects from the wall.

We claim:

1. A tightening nut for an article such as a bolt adapted to be tightened and projecting in relation to a mounting surface, said tightening nut comprising first and second nut rings displaceable one inside the other in the axial direction, said first nut ring bearing against said mounting surface and said second nut ring surrounding and engaging said article, and at least one thrust stud interposed between said first and second nut rings and adapted during tightening of said nut to be tilted from an inclined position relatively to the nut axis into a position parallel to said nut axis, wherein said second nut ring or a drive ring mounted between said thrust studs and one of said nut rings is rotatable to produce said tilting of said thrust studs, and a drive pin having an axis of rotation parallel to said nut axis is mounted for rotation in a non-rotatable one of said nut rings and is in geared connection with said second nut ring or said drive ring respectively.

2. A tightening nut according to claim 1, wherein said drive pin has an eccentric dog engaging in a recess in said second nut ring or said drive ring.

3. A tightening nut according to claim 2, wherein the eccentricity of said dog is equal to the travel necessary for tilting said studs into said parallel position.

4. A tightening nut according to claim 2, wherein said dog of said drive pin and all said recess in said second nut ring or said drive ring is circular in crosssection, or said dog is cylindrical and said recess in said second nut ring or said drive ring is a groove extending in a radial direction.

5. A tightening nut according to claim 1, wherein said one nut ring is constructed in the form of a ball and socket joint.

6. A tightening nut according to claim 1, wherein at least one spring is provided between said first and second nut rings to urge them to the untighten configuration.

7. A tightening nut according to claim 6, wherein said at least one spring is initially tensioned.

* * * * *